United States Patent

[11] 3,590,839

| [72] | Inventor | Daniel M. Moore |
| | | Glendora, Calif. |
| [21] | Appl. No. | 749,098 |
| [22] | Filed | July 31, 1968 |
| [45] | Patented | July 6, 1971 |
| [73] | Assignee | The United States of America as represented by the Secretary of the Navy |

[54] INTERLOCKING SEQUENCE VALVE FOR LIQUID FUEL
13 Claims, 2 Drawing Figs.

[52] U.S. Cl. .................................................. 137/71,
  60/39.14, 123/136, 251/63, 251/325, 431/19
[51] Int. Cl. ..................................................... F16k 17/16
[50] Field of Search ......................................... 251/62, 63,
  63.5, 63.6, 324, 325, 25; 137/68, 71, 318, 529,
  538, 95; 222/5; 431/19; 103/16

[56] References Cited
UNITED STATES PATENTS

| 2,059,808 | 11/1936 | Robart et al. ................. | 137/95 |
| 3,159,378 | 12/1964 | Haag ............................ | 251/325 |
| 2,683,963 | 7/1954 | Chandler ...................... | 60/259 X |
| 2,880,582 | 4/1959 | Turansky et al. .............. | 60/259 X |
| 3,051,652 | 3/1962 | Olandt .......................... | 169/31 |
| 3,391,951 | 7/1968 | Miller ........................... | 137/68 X |

FOREIGN PATENTS

| 751,904 | 7/1956 | Great Britain ................ | 137/68 |

*Primary Examiner*—William F. O'Dea
*Assistant Examiner*—Richard Gerard
*Attorneys*—Justin P. Dunlavey, Ervin F. Johnston and John Stan ABSTRACT: A normally closed check valve, featuring a spring-biased piston assembly, which opens and remains open only as long as a predetermined value of pressure is present at its control port. Linear motion of the piston assembly then moves an O-ring seal mounted on the piston assembly to a position where it no longer inhibits communication between the inlet and outlet ports of the check valve. A decrease in the pressure below the required value restores the piston assembly to its original position, thereby closing the check valve.

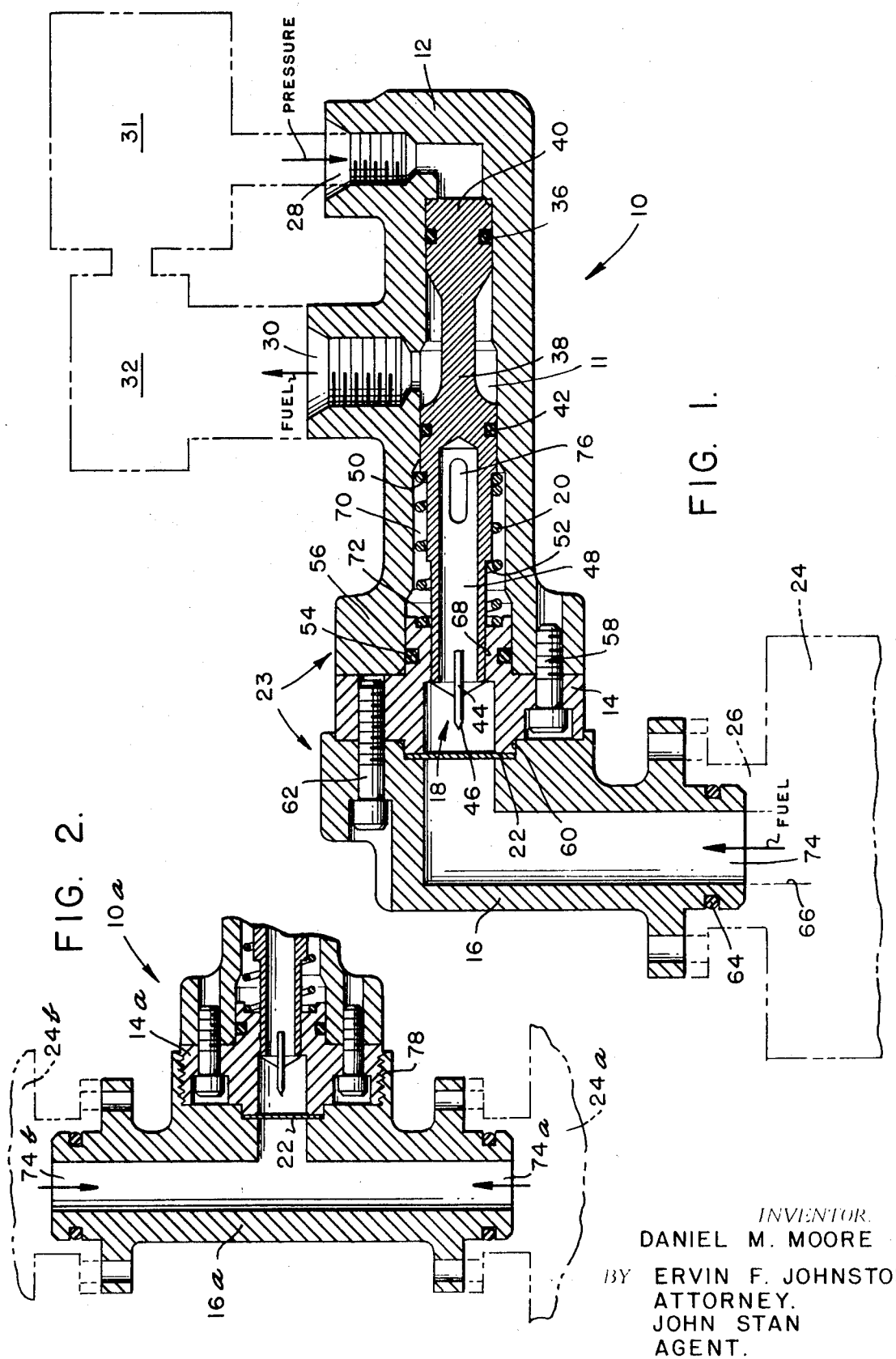

INTERLOCKING SEQUENCE VALVE FOR LIQUID FUEL

The invention described herein may be manufactured and used by or for the government of the United States of America for governmental purposes without the payment of any royalties thereon or therefore.

In the prior art, to control the release of a stored fuel in the proper time sequence, after ignition had started in a chamber, an electric solenoid-operated valve was used to release the fuel from a fuel tank. This prior art method had several serious problems: (1) electric solenoid valves require a continuous and large electrical power source to maintain the valve in the operating position; (2) these solenoid valves were not capable of meeting environmental and shock requirements; and (3) the sequence of valve operation could not always be coordinated to allow fuel to be admitted to the combustion chamber during the ignition starting cycle.

The invention herein disclosed has a positive seal interrupting the central passage within a valve body to prevent fuel from the fuel tank inlet port from leaking through the valve body during the storage period, which feature was not present in the prior art. Lack of this positive seal could create an explosion hazard during ignition startup.

The check valve herein described serves an interlocking valve whose function it is to prevent fuel from a fuel supply from being fed into a system unless the pressure at one of its ports, herein termed a control port, exceeds a certain value. The valve is adapted for mounting at a fuel tank outlet and controls the release of fuel from the tank. Additionally, the valve has a rupturing means and a rupture seal in the form of a diaphragm. This diaphragm, which may be of metal, is punctured the first time that the check valve is open.

Accordingly, an object of the invention is to overcome the aforementioned problems associated with prior art check valves.

Another object is to provide a mechanical check valve which will open and release fuel from a fuel tank only when fuel can be safely ignited in a combustion chamber.

Yet another object of the present invention is the provision of a mechanical check valve which is adapted to confine fuel to a fuel tank during storage of a fuel supply system and which will release fuel to a combustion chamber only under safe conditions.

A still further object of the invention is the provision of a mechanical check valve with a fail-safe feature, insuring that the valve will close and reseal the fuel tank when valve-operating pressure is removed.

Other objects and many attendant advantages of this invention will be readily appreciated as the same becomes better understood by reference to the following detailed description, when considered in connection with the accompanying drawings, in which like reference numerals designate like parts throughout the figures thereof and wherein:

FIG. 1 shows a cross-sectional view of the check valve of this invention.

FIG. 2 shows a partial view in cross section of another embodiment of the check valve, by means of which fuel from two different fuel tanks can be fed to one valve fuel output port and controlled by the pressure at one control port.

Referring now to the drawings in more detail, wherein like reference numerals designate like or corresponding parts throughout the several views, there is shown in FIG. 1, which illustrates a preferred embodiment, a check valve 10 having a central passage 11, therein. The check valve 10 consists of six basic parts: a valve housing 12, a cap 14, a support 16, a piston and knife assembly 18, a compression spring 20, and a diaphragm or disc 22. The housing 12, cap 14 and support 16 comprise a valve body 23.

The check valve 10 may be mounted by means of its support 16, to a fuel supply, such as a fuel tank 24, at the fuel tank outlet 26. However, most of the important elements of the check valve 10 are located within the valve housing 12.

The valve housing 12 contains two ports 28 and 30 for attaching fuel fittings. The port 28, which may be termed a control port, located at one end of the housing 12, communicates with a source of pressure, such as the pressure produced by the combustion of a fuel within a combustion chamber 31. A valve fuel outlet port 30, which is located more centrally, is connected to the combustion chamber 31 through a fuel pump 32.

A piston and knife assembly 18, situated within the central passage 11 in the valve body 23 and primarily within the housing 12, contains an O-ring seal 36 at one end of the assembly to confine the pressure from the combustion chamber 31 to the piston 38 at its closed end 40. A second O-ring seal 42, more centrally located, seals the valve fuel outlet port 30 until the piston and knife assembly 18 is moved.

A rupturing means in the form of a pointed knife 44, with swept-back knife edges 46, is secured at the hollow end 48, of the piston 38. A compression spring 20 is confined between a shoulder 50 on the piston 38 and the cap 14. A second shoulder 52, at the hollow end 48 of the piston 38, limits the piston travel when it contacts the cap 14.

The cap 14, containing an O-ring seal 54, is secured to the end 56 of the housing 12 which is near the fuel tank 24 with machine screws 58. The diaphragm 22, located in a recess 60 of the valve support 16, is firmly held in place by machine screws 62 which secure the assembled valve to the support 16. The support 16, containing an O-ring seal 64, is secured at the fuel tank outlet 26.

Valve operation begins with gas under pressure from the source of pressure, which may be, as pointed out, hereinabove, produced by the combustion of the fuel within a combustion chamber 31, entering the housing 12 at control port 28 and causing the piston and knife assembly 18 to move against the restraining force of the compression spring 20. The knife 44 pierces the diaphragm 22 at its center and partially cuts the diaphragm at each side of the center cut. As the piston 38 passes through the diaphragm 22, each severed portion folds away from the cap 14 and into the support 16, hinging at a small uncut edge, and is held out of the direct path of the fuel flow, shown by arrows, by the outside surface 68 of the piston 38. The O-ring seal 42 moves with the piston and knife assembly 18 into the enlarged portion 70 of the central passage 11 through the valve housing 12, unsealing the valve fuel outlet port 30. Piston travel stops when the shoulder 52 contacts the cap 14 at the recessed opening 72 in the cap.

In some applications, the positive seal in the form of the diaphragm 22 would not be required, in which case the piston and knife assembly 18 would be replaced by a simple piston assembly requiring no rupturing means, such as the knife.

The diaphragm 22 having been ruptured, fuel flows from the fuel tank 24, through the fuel tank outlet port 66, through the valve fuel inlet port 74, through the hollow end 48 of the piston 38, through longitudinal slots 76 in the hollow end of the piston and out of the valve fuel outlet port 30 in the housing 12 of the valve 10 and through the fuel pump 32 and into the combustion chamber 31.

Closing action of the valve 10 occurs when the required gas pressure, caused, in this instance, by the combustion of the fuel, is no longer present at the control port 28, allowing the spring-loaded piston and knife assembly 18 to return to its normally closed position. As the piston 38 returns to its original position, the O-ring seal 42 reseals the valve fuel outlet port 30, thereby preventing further fuel flow and resealing the fuel tank 24. In addition to the closing force exerted by the compression spring 20, fuel tank pressure and fuel flow through the piston 38 assist in closing of the valve 10.

FIG. 2 shows an embodiment of the invention wherein the valve 10a incorporates a valve support 16a with two valve fuel inlet ports 74a and 74b, each connected to a different fuel tank 24a and 24b. In this embodiment, the support 16a is screwed onto the cap 14a, as shown by the threading 78. The other parts of the valve 10a, not mentioned, are similar in shape and function to corresponding parts shown in the embodiment of FIG. 1.

Obviously many modifications and variations of the present invention are possible in the light of the above teachings. It is therefore to be understood that within the scope of the appended claims the invention may be practiced otherwise than as specifically described.

What I claim is:

1. A pressure-operated check valve comprising:
a valve body, open at both ends, having a central passage communicating between the ends, and provided with a fuel inlet port, a fuel outlet port and control port which is adapted to be connected to a pressure source, all ports opening into the central passage;
a piston assembly, including a piston, coaxial with an mounted for slidable movement within the central passage of the body between open and closed positions, in the closed position, the assembly providing a seal between the inlet and outlet ports, while in the open position, the assembly permitting flow between the inlet and outlet ports;
said piston assembly being exposed to and responsive to variations in the pressure at the control port to control the positioning of the piston assembly;
a biasing means urging the piston assembly into a closed position until the pressure at the control port exceeds a predetermined level;
a diaphragm, disposed across the central passage between the fuel inlet and outlet ports, which is unbroken when the piston assembly in in the closed position; and
a rupturing means connected to the piston assembly for rupturing the diaphragm when the piston assembly moves to the open position.

2. The check valve of claim 1, in which the seal between the inlet and outlet ports is effected by an O-ring mounted on the piston.

3. The check valve of claim 1, in which the biasing means is a compression spring mounted about the piston.

4. The check valve of claim 1, wherein the rupturing means is a knife.

5. The check valve of claim 1, wherein:
the valve body includes:
a support, including the fuel inlet port, adapted to be attached to a fuel tank;
a cap connected to the support;
a housing, including the fuel outlet port and the control port, and connected to the cap;
the support, cap and housing having the central passage communicating therethrough; and wherein
the diaphragm is fixed in place, and before rupturing, closes the central passage between the support and the cap; and wherein
the piston assembly is located in the central passage of the housing and cap.

6. The check valve of claim 1, further comprising:
another fuel inlet port wherein the flow of fuel through both fuel inlet ports is controlled by the pressure at the control port.

7. A pressure-operated check valve comprising:
a valve body, open at both ends, having a central passage communicating between the ends, and provided with a fuel inlet port, a fuel outlet port and a control port which is adapted to be connected to a pressure source, all ports opening into the central passage;
the valve body comprising:
a housing, including the fuel outlet port at a central portion thereof and the control port at a first end thereof;
a cap, connected to the housing at a second end thereof, the central passage through the cap constituting the fuel inlet port, the cap serving to limit motion of the piston assembly in the fully open position;
a piston assembly coaxial with and mounted for slidable movement within the central passage of the body between open and closed positions, in the closed position, the assembly providing a seal between the inlet and outlet ports, while in the open position, the assembly permitting flow between the inlet and outlet ports;
said piston assembly being exposed to and responsive to variations in the pressure at the control port to control the positioning of the piston assembly;
the piston assembly comprises:
a piston;
an O-ring mounted on the piston near the control port, which serves to confine the pressure from the pressure source to the first end of the valve housing irrespective of the position of the piston assembly; and
a biasing means urging the piston assembly into a closed position until the pressure at the control port exceeds a predetermined level.

8. The check valve of claim 7, in which the seal between the inlet and outlet ports is effected by another O-ring mounted on the piston.

9. The check valve of claim 8, further comprising:
a diaphragm disposed across the central passage between the fuel inlet and outlet ports, which is unbroken when the piston assembly is in the closed position; and
a rupturing means connected to the piston assembly for rupturing the diaphragm when the piston assembly moves to the open position.

10. The check valve of claim 9, wherein the rupturing means is a knife.

11. The check valve of claim 9, wherein:
the valve body includes:
a support, including a fuel inlet port, adapted to be attached to a fuel tank;
a cap connected to the support;
a housing, including the fuel outlet port and the control port, and connected to the cap; and wherein
the diaphragm is fixed in place, and before rupturing, closes the central passage between the support and the cap, and wherein
the piston assembly is located in the central passage of the housing and cap.

12. The check valve of claim 7, further comprising:
another fuel inlet port wherein the flow of fuel through both fuel inlet ports is controlled by the pressure at the control port.

13. The check valve according to claim 11, wherein the piston further comprises the following cylindrical sections:
1. a hollow section having a relatively small outside diameter, with respect to the average diameter of the central passage, located at the fuel inlet side of the valve body;
2. a hollow section having an intermediate outside diameter and a shoulder where it joins the section having a small outside diameter, the shoulder serving to limit the motion of the piston assembly in the fully open position, the section having slots through the wall structure; the two hollow sections, having the same inside diameter, communicating with the fuel inlet port:
3. two solid sections having a larger outside diameter than the hollow sections, including those sections of the piston which include the O-rings; and
4. a necked-down section between the two solid sections, having a diameter approximately equal to the inside diameter of the hollow sections, the central passage adjacent this section communicating with the fuel outlet port;
the width of the sections being so proportioned that, when the piston assembly is in the closed position, there is no communication from the fuel inlet port, through the two hollow sections, to the fuel outlet port, but in the open position there is such communication through the slots and the necked-down section of the piston.